US012759564B2

(12) United States Patent
Appleton et al.

(10) Patent No.: US 12,759,564 B2
(45) Date of Patent: Oct. 13, 2026

(54) PREDICTIVE MACHINE CONTROL

(71) Applicant: Deere & Company, Moline, IL (US)

(72) Inventors: Andy B. Appleton, Cedar Falls, IA (US); Nohoon Ki, Cedar Falls, IA (US); Wissam H. El-Ratal, Waterloo, IA (US); Rui Zhang, Waterloo, IA (US); Justin T. Roth, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 38 days.

(21) Appl. No.: 19/186,173

(22) Filed: Apr. 22, 2025

(65) Prior Publication Data

US 2025/0296577 A1 Sep. 25, 2025

Related U.S. Application Data

(62) Division of application No. 18/408,216, filed on Jan. 9, 2024, now Pat. No. 12,344,260, which is a division
(Continued)

(51) Int. Cl.
*B60W 50/00* (2006.01)
*A01B 69/04* (2006.01)
(Continued)

(52) U.S. Cl.
CPC ....... *B60W 50/0097* (2013.01); *A01B 69/008* (2013.01); *A01B 79/005* (2013.01); *A01D 41/1278* (2013.01); *G06Q 10/047* (2013.01); *G06Q 30/0284* (2013.01); *B60W 2300/152* (2013.01)

(58) Field of Classification Search
CPC ................................................ B60W 50/0097
See application file for complete search history.

(56) References Cited

U.S. PATENT DOCUMENTS 5,995,895 A * 11/1999 Watt .................... G05D 1/0274
56/10.2 G
9,235,214 B2 1/2016 Anderson
(Continued)

FOREIGN PATENT DOCUMENTS

CN 105045098 A * 11/2015
CN 105045098 B * 11/2017
(Continued)

OTHER PUBLICATIONS

German Search Report issued in counterpart Application No. 102020212106.0 dated May 31, 2021, 12 pages.

*Primary Examiner* — Shelley Chen
(74) *Attorney, Agent, or Firm* — Christopher J. Volkmann; KELLY, HOLT & CHRISTENSON PLLC

(57) ABSTRACT

A policy map is obtained that includes prescribed machine settings values for controlling a machine to perform an operation at different locations in the field. Sensor signals indicating conditions that will be encountered by the machine in the future, as it moves through the site. A predictive model provides an expected machine response, based upon the future condition and a prescribed machine setting value. An adjusted machine setting value is generated based on the expected machine response. Control signals are generated, based on the adjusted machine setting value, to control a set of controllable subsystems.

8 Claims, 10 Drawing Sheets

Related U.S. Application Data of application No. 16/668,478, filed on Oct. 30, 2019, now Pat. No. 11,904,871.

(51) Int. Cl.

| | |
|---|---|
| ***A01B 79/00*** | (2006.01) |
| ***A01D 41/127*** | (2006.01) |
| ***G06Q 10/047*** | (2023.01) |
| ***G06Q 30/0283*** | (2023.01) |

(56) References Cited

U.S. PATENT DOCUMENTS

| | | | | |
|---|---|---|---|---|
| 9,656,656 | B2 | 5/2017 | Xing et al. | |
| 9,891,629 | B2 | 2/2018 | Murray et al. | |
| 10,801,935 | B2 | 10/2020 | Ki et al. | |
| 10,814,856 | B2 * | 10/2020 | Kumar | B61C 15/14 |
| 11,079,725 | B2 | 8/2021 | Palla et al. | |
| 2003/0018423 | A1 * | 1/2003 | Saller | A01M 7/0089 701/50 |
| 2015/0232097 | A1 * | 8/2015 | Luther | G01C 21/3415 701/1 |
| 2016/0298306 | A1 * | 10/2016 | De Kontz | G05D 1/0219 |
| 2016/0299111 | A1 * | 10/2016 | De Kontz | G01W 1/00 |
| 2016/0299511 | A1 * | 10/2016 | De Kontz | E21F 5/02 |
| 2016/0355198 | A1 * | 12/2016 | Dulmage | B61L 27/70 |
| 2019/0188031 | A1 * | 6/2019 | Balachandran | G06F 9/4818 |
| 2020/0033890 | A1 * | 1/2020 | Sugaki | G01C 21/26 |
| 2020/0079443 | A1 * | 3/2020 | Sauvageau | B62D 55/084 |
| 2020/0150673 | A1 * | 5/2020 | Qiu | G01C 21/3614 |
| 2020/0181876 | A1 * | 6/2020 | Mahrenholz | E02F 3/43 |
| 2020/0278680 | A1 * | 9/2020 | Schulz | G05D 1/0257 |
| 2021/0007277 | A1 | 1/2021 | Anderson | |
| 2021/0129853 | A1 | 5/2021 | Appleton et al. | |

FOREIGN PATENT DOCUMENTS

| | | | | | |
|---|---|---|---|---|---|
| CN | 106643719 | B | * | 4/2020 | G01C 21/20 |
| CN | 109247324 | B | * | 12/2020 | A01M 7/0089 |
| CN | 112154447 | A | * | 12/2020 | |
| DE | 112019001832 | | | 2/2018 | |
| DE | 102017221134 | A1 | * | 5/2019 | A01B 3/002 |
| DE | 112019001832 | T5 | * | 2/2021 | B60W 30/06 |
| EP | 3578031 | A1 | * | 12/2019 | A01B 79/005 |
| JP | 2013228821 | A | * | 11/2013 | A01D 34/008 |

* cited by examiner

PREDICTIVE MACHINE CONTROL

CROSS-REFERENCE TO RELATED APPLICATION

The present application is a divisional of and claims priority of U.S. Patent application Ser. No. 18/408,216, filed Jan. 9, 2024, which is a divisional of and claims priority of U.S. patent application Ser. No. 16/668,478 (now U.S. Pat. No. 11,904,871), filed October 30, 2019; the contents of these applications are hereby incorporated by reference in their entirety.

FIELD OF THE DESCRIPTION

The present description relates to controlling a mobile machine. M ore specifically, the present description relates to using an embedded controller using predictive control, to control the mobile machine.

BACKGROUND

There are many different types of mobile machines. Those machines can include such things as agricultural machines, construction machines, forestry machines, among others.

There have been many different attempts made to control vehicles to obtain a desired productivity or efficiency. Such approaches can include fully manual control where an operator provides all control settings. The approaches have also included partially automated control which automate parts of the control systems, but which rely on manual control as well.

These types of automated or partially automated control systems have normally used reactive type controllers. A reactive type controller operates based upon measured information (which may be measured from sensors) or user input information. For instance, a sensor may sense the vehicle orientation and the control system may increase power to the vehicle when the vehicle is traveling up a hill. Similarly, the vehicle may sense that a wheel is slipping and, in response, transfer more power to other wheels, that have more traction. Still other types of systems receive a setting input, measure a machine output, and attempt to control the machine so that the measured output matches the setting input. Again, all of these different types of control systems are reactive. They receive an input value and react to a measured output value in order to attempt to maintain the output at the desired input value.

The discussion above is merely provided for general background information and is not intended to be used as an aid in determining the scope of the claimed subject matter.

SUMMARY

A policy map is obtained that includes prescribed machine settings values for controlling a machine to perform an operation at different locations in the field. Sensor signals indicating conditions that will be encountered by the machine in the future, as it moves through the site. A predictive model provides an expected machine response, based upon the future condition and a prescribed machine setting value. An adjusted machine setting value is generated based on the expected machine response. Control signals are generated, based on the adjusted machine setting value, to control a set of controllable subsystems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
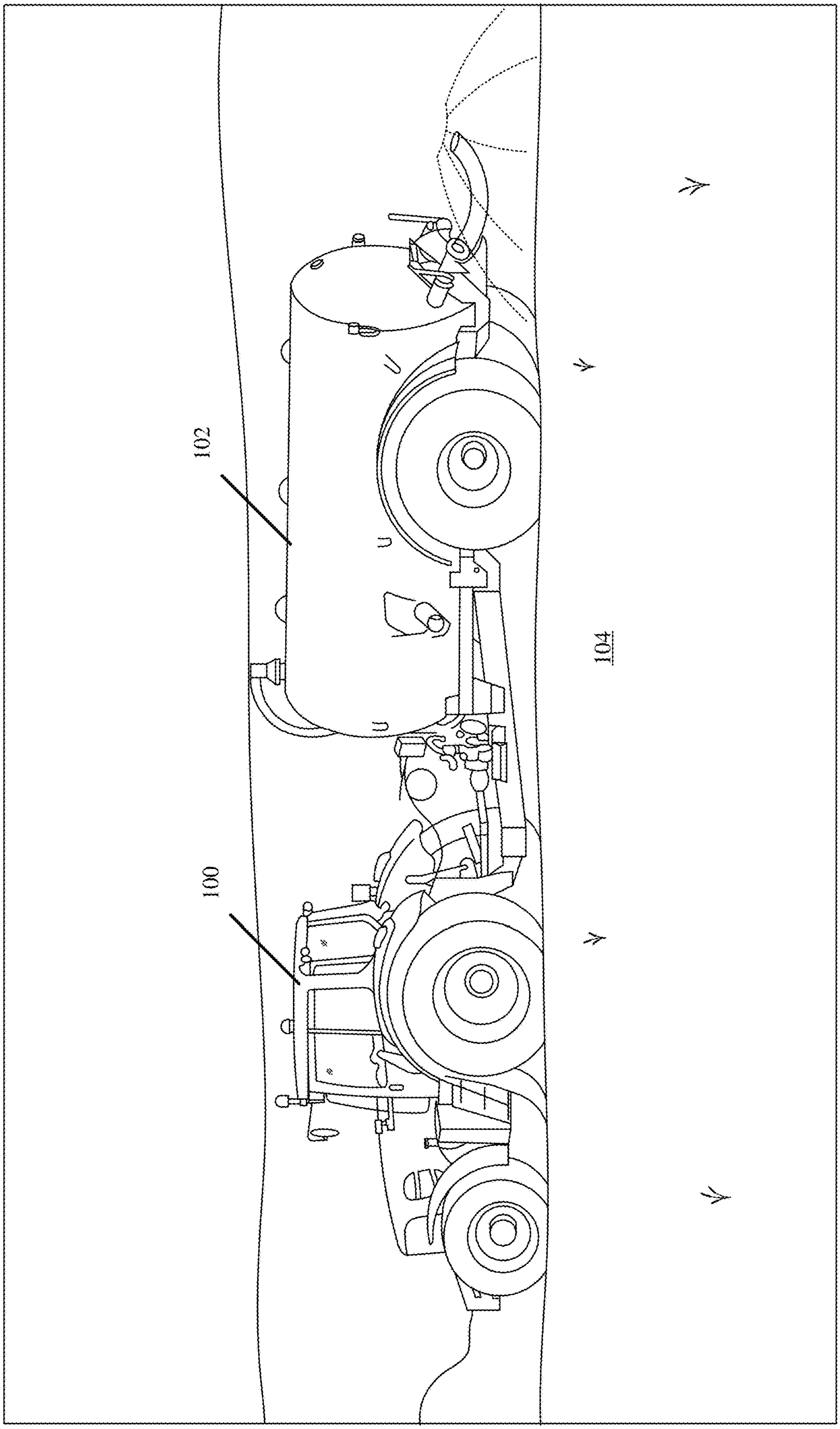
FIG. 1 is a pictorial illustration of one example of agricultural machines.

As discussed above, many current control systems attempt to control agricultural vehicles in a reactive way. The control systems sense an operating characteristic in an attempt to modify a control signal based upon the sensed operating characteristic. The performance level achieved by these systems is somewhat reduced based upon their reactive nature. They are unable to dynamically change settings values that are used to operate the machine, while operating in the field, based upon an observation of what sensors will observe, or what the vehicle will experience, at a future state (such as within the next several seconds).

The present description thus proceeds with respect to a predictive system that is used for machine control. A plant model, which models the agricultural equipment being controlled, is used to generate an optimal (or otherwise desired) policy map for performing an operation in a field. The policy map illustratively identifies a trajectory (e.g., the path or route to be taken by the vehicle), as well as the machine settings, and sequence of operations, that are to be performed, while the machine travels over that trajectory. The policy map is generated for performing a particular operation, with a particular machine, at a particular location.

The policy map is loaded onto the machine which includes a predictive controller. The predictive controller includes an optimizer or adjustment component that receives the optimal (or otherwise desired) values from the policy map and determines whether an adjustment is to be made to those values based upon future looking sensors that sense what the machine will be experiencing in the future. The optimizer (or adjustment component) determines costs (by applying an objective function) that will be incurred by making the various adjustments from the optimum (or otherwise desired) settings values. An adjustment selector selects an adjustment based upon those costs. The adjustment component outputs adjusted control values to a control signal generator. The adjusted control values, are also provided to a predictive vehicle model that generates an expected vehicle response based upon the adjusted control values, and provides the expected response back to the cost determination component (optimizer). The control signal generator generates control signals to control the machine (e.g., controllable subsystems on the machine) based upon the adjusted control values.

A set of current machine setting/operating characteristic sensors senses a current state of the machine and provides measured values, indicative of that current state, back to the setting prediction system. In this way, the control system is not just controlling the vehicle in a reactive mode. Instead, it is using forward-looking sensors and a predictive vehicle model to control the vehicle based upon the vehicle's expected response to conditions that are about to occur, in the future. This can be used to greatly enhance the productivity, efficiency, wear characteristics and/or other characteristics of the machine in performing the operation.

FIG. 1 is a pictorial illustration showing one example of a set of agricultural equipment that can be modeled, and controlled to perform a desired operation in a field. The agricultural equipment illustratively includes a tractor 100 that is towing a slurry tank 102. The slurry tank 102 is controlled to spread a material on a field 104. In one example, the operation can be broken into different phases, including transport of the tractor 100 and slurry tank 102 to the field, over a road, spreading the slurry on the field, and then transporting the tractor 100 and slurry tank 102 back to a desired refill location. The present description will proceed with respect to the agricultural equipment being tractor 100 and slurry tank 102, and the desired operation being to spread a material, using slurry tank 102, on a pre-defined field 104. It will be noted, however, that the equipment and operation can vary and be substantially any desired mobile equipment performing any desired operation, including agricultural operations, forestry operations, construction operations, etc.

Figure 2:
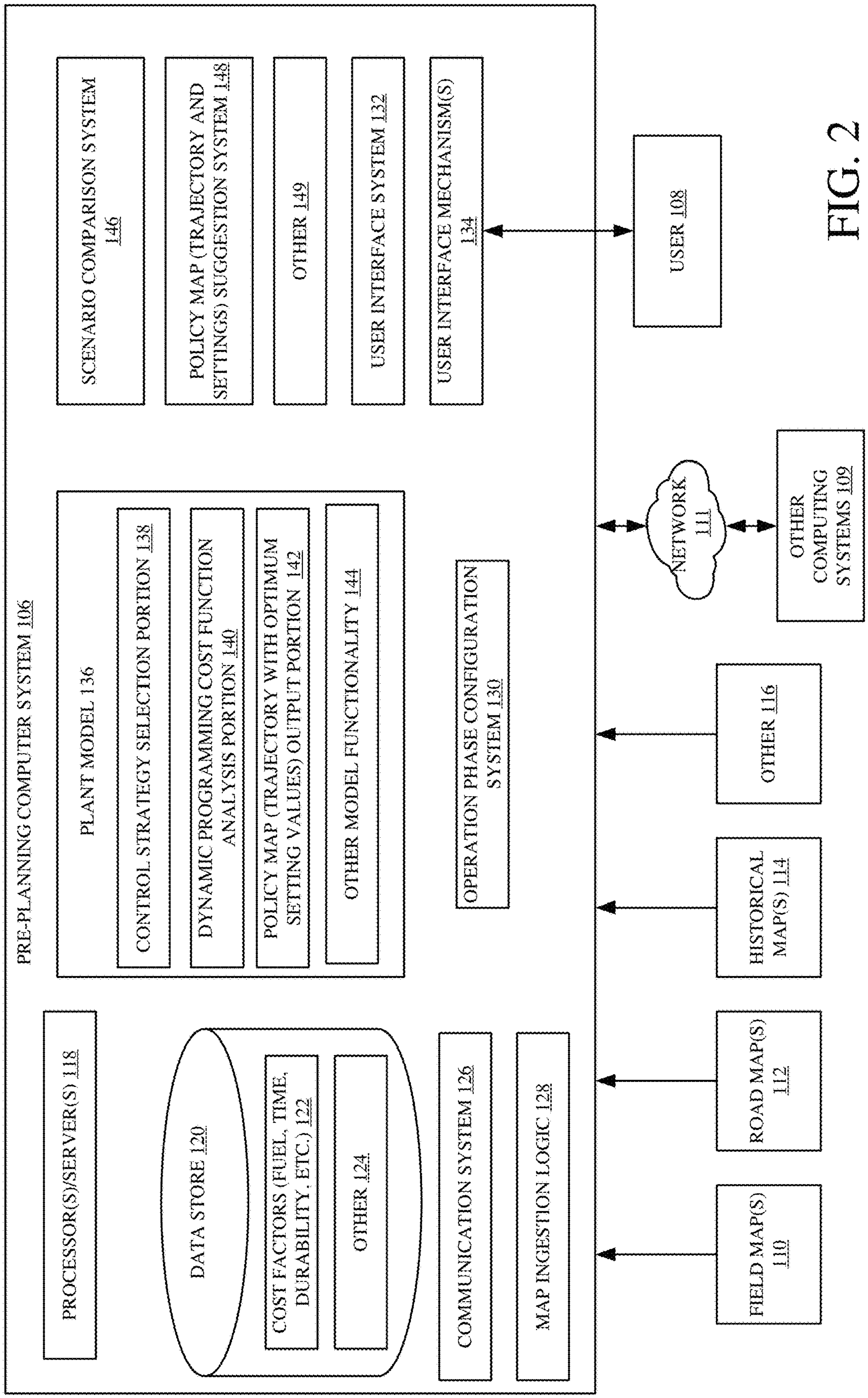
FIG. 2 is a block diagram of one example of a pre-planning computer system.

FIG. 2 is a block diagram showing one example of a pre-planning computer system 106. Computer system 106 can be used by a user 108 in order to pre-plan the operation to be performed by equipment 100, 102 and to obtain a policy map (which includes a trajectory and optimum, or otherwise desired, settings) that will be used by tractor 100 and slurry tank 102 at each point in field 104 over which they travel. In one example, user 108 can identify an operation, the equipment used to perform the operation and the location (e.g., field) where the operation is to be performed. User 108 can also select a control strategy which defines the optimum (or otherwise desired) policy map. For instance, the user may select a control strategy corresponding to fuel economy, in which case the optimum policy map will be one that is optimized (or otherwise generated) based on estimated fuel efficiency. In another example, user 108 may select as a control strategy corresponding to a time efficiency strategy. In that case, the policy map will be optimized (or otherwise generated) based on time efficiency. Other control strategies can be used as well, such as a durability strategy. In that case, the policy map may be generated to optimally reduce the amount of wear that will be encountered by tractor 100 and/or slurry tank 102 during the operation. These are just examples of control strategies that can be selected or input by user 108 in order to generate a policy map for the desired equipment to perform the desired operation at the desired field location.

Pre-planning computer system 106 also illustratively allows user 108 to propose a variety of different trajectories (or routes) so that pre-planning computing system 106 can provide an output indicative of how those trajectories vary based upon the control strategy. It can provide those outputs in a way that can be statistically analyzed so they can be compared by user 108 and so that user 108 can make an informed selection of the particular policy map to use for controlling tractor 100 and tank 102 to perform the desired operation under the cost determinate criteria.

FIG. 2 shows that pre-planning computer system 106 can receive inputs not only from user 108, but also from other sources. By way of example, it can receive field maps 110, road maps 112, historical maps 114 that may show a variety of different types of historical and present values for the field being treated, such as soil conditions (e.g., mud, dry conditions, sandy conditions, etc.), yield, and other. Field maps 110 can include such things as topology, elevation, soil type, etc. Road maps 112 may identify the topology or elevation changes on a road that leads to the field to be treated, the road conditions, construction and detours, among other things. Pre-planning computer system 106 can also receive a wide variety of other maps or other information 116.

Pre-planning computing system 106 can communicate with other computing systems 109 over network 111. Other computing systems 109 can include vendor computing systems, farm manager computing systems, or a wide variety of other computing systems. Network 111 can include a local area network, a wide area network, a near field communication network, a cellular communication network, or any of a wide variety of other networks or combinations of networks.

Before describing the overall operation of pre-planning computer system 106 in more detail, a brief description of some of the items in pre-planning computer system 106, and their operation, will first be provided.

Pre-planning computer system 106 illustratively includes one or more processors or servers 118, and data store 120 which can include cost factors that are provided by user 108 or received in another way. The cost factors 122 can include such things as the cost of fuel, the cost of time of running the equipment, the cost of different operations (e.g., shifting) on the durability of the equipment (e.g., on the transmission), among other things. Data store 120 can also include a wide variety of other information 124.

Pre-planning computer system 106 also illustratively includes communication system 126, map ingestion logic 128, operation phase configuration system 130, user interface system 132, user interface mechanisms 134, plant model 136 (which, itself, includes control strategy selection portion 138, dynamic programming cost function analysis portion 140, policy map (trajectory with optimum settings values) output portion 142, and it can include other model functionality 144). Pre-planning computer system 106 can also include scenario comparison system 146, trajectory suggestion system 148 and it can include a wide variety of other computing system functionality 149.

Communication system 126, by way of example, facilitates communication among the items in pre-planning computing system 106, and it can communicate with other computing systems 109 over network 111. Therefore, communication system 126 may be configured to communicate based upon the type of network 111 that is being used.

User interface mechanisms 134 can include a wide variety of different types of mechanisms, such as a point and click device, joysticks, buttons, keypads, etc. They can also include a touch sensitive screen where touch gestures can be used by user 108, a microphone where speech recognition is provided, among a wide variety of other mechanisms. User interface system 132 detects user interaction with user interface mechanisms 134 and provides an indication of those interactions to other items in pre-planning computer system 106. Therefore, user 108 can illustratively interact with user interface mechanisms 134 in order to control and manipulate pre-planning computer system 106 and some parts of other computing systems 109.

Map ingestion logic 128 can be controlled by user 108 in order to ingest one or more of the different maps 110, 112, 114, and other information 116. These can be directly obtained by (or loaded into) system 106 or obtained over network 111. Operation phase configuration system 130 can be used to surface a user experience that can be navigated by user 108 in order to configure different phases of the operation. In the example where the operation is to spread material using tractor 100 and wagon 102, the different phases may include transport to the field, the material application operation, and then transport back from the field. User 108 illustratively uses operation phase configuration system 130 to define and sequence the different phases of the operation to be conducted.

Plant model 136 is illustratively a model that models the operation of the equipment 100, 102 that will be used to perform the operation. The plant model 136 can be used to estimate the performance of equipment 100, 102 in performing the operation, given different scenarios provided by user 108. By way of example, the plant model 136 can model the drive train, engine, thermal response, controls, traction mechanisms (e.g., wheels, tracks, etc.), hydraulics, electrical system, responsiveness, and a wide variety of other characteristics of the equipment 100, 102, in performing the operation. The model may be already generated, and selectable by user 108 from a library of models, or it can be dynamically developed by system 106 based on user 108 providing characteristics of the equipment 100, 102. Similarly, it may be that the model of the equipment 100, 102 in performing the particular operation may already exist so that the user 108 can select the desired operation from a library of operations, in which case the plant model 136 that models equipment 100, 102 in performing that particular operation will be loaded into pre-planning computer system 106. The plant model 136 can be obtained in other ways as well.

In one example, plant model 136 includes control strategy selection portion 138 which allows user 108 to specify a particular control strategy to be used by plant model 136 in generating a policy map. Dynamic programming cost function analysis portion 140 illustratively computes different costs associated with a trajectory that is input by user 108, for various different sets of setting values. It identifies an optimal (or otherwise desired) set of setting values, for the trajectory input by user 108, given the control strategy selected using the control strategy selection portion 138. Policy map (trajectory and optimum settings values) output portion 142 outputs a best policy map, given the trajectory input by user 108. Policy map suggestion system 148 can suggest a policy map for user 108, suggest changes to the trajectory input by user 108 or provide other suggestions.

Figure 3A:
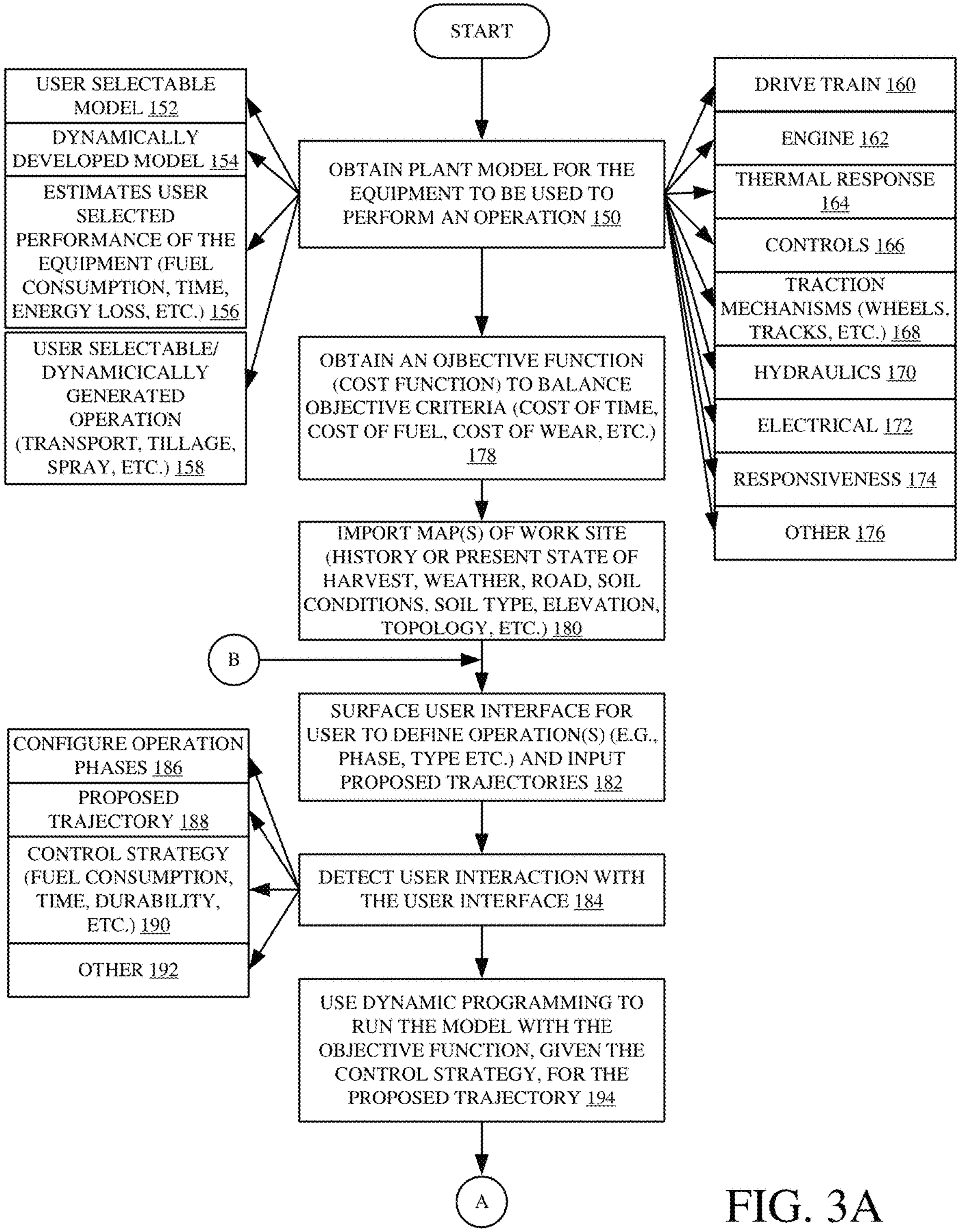
FIGS. 3A-3C (collectively referred to herein as FIG. 3) show a flow diagram illustrating one example of the operation of the pre-planning computer system shown in FIG. 2.
Figure 3B:
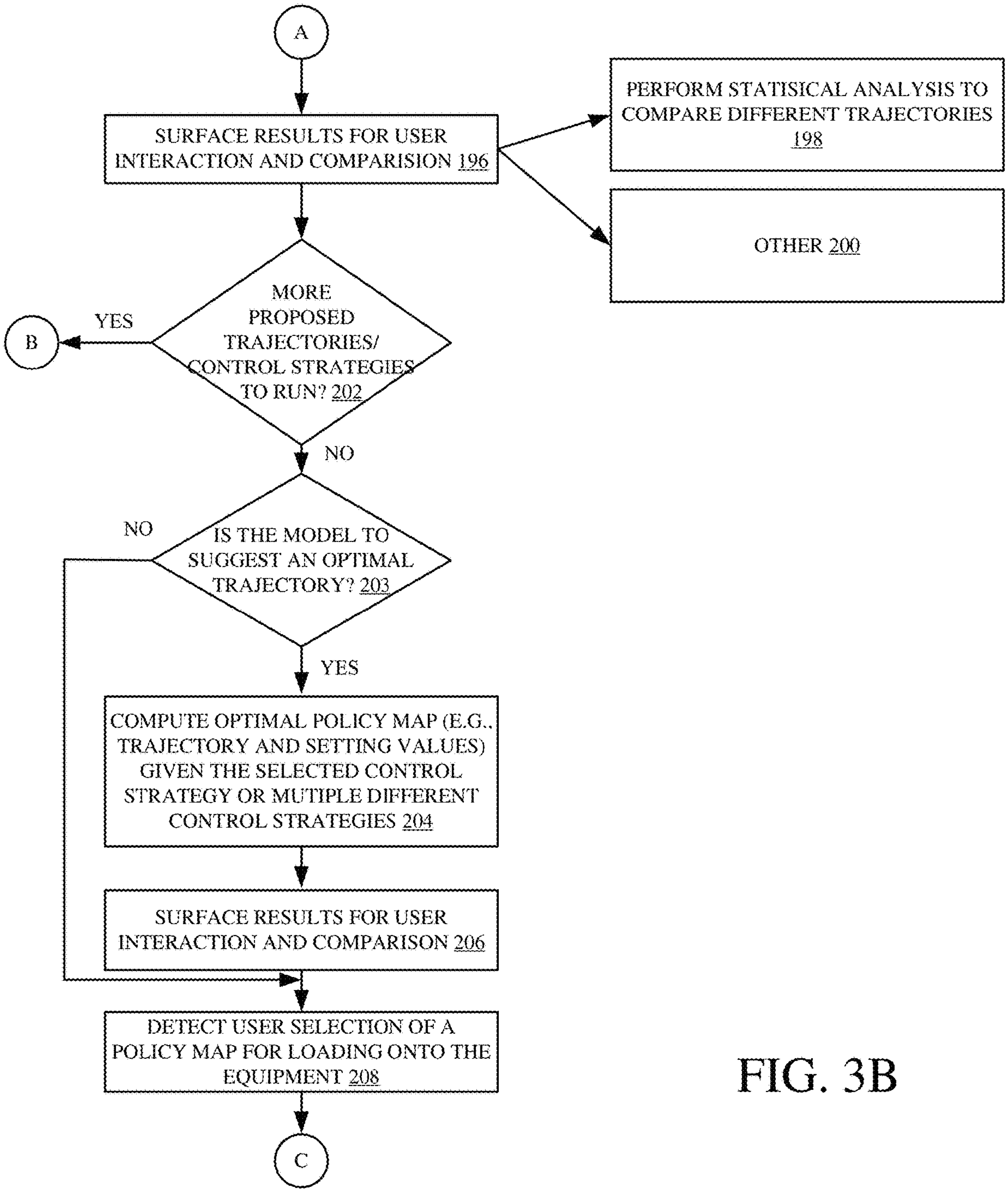
Figure 3C:
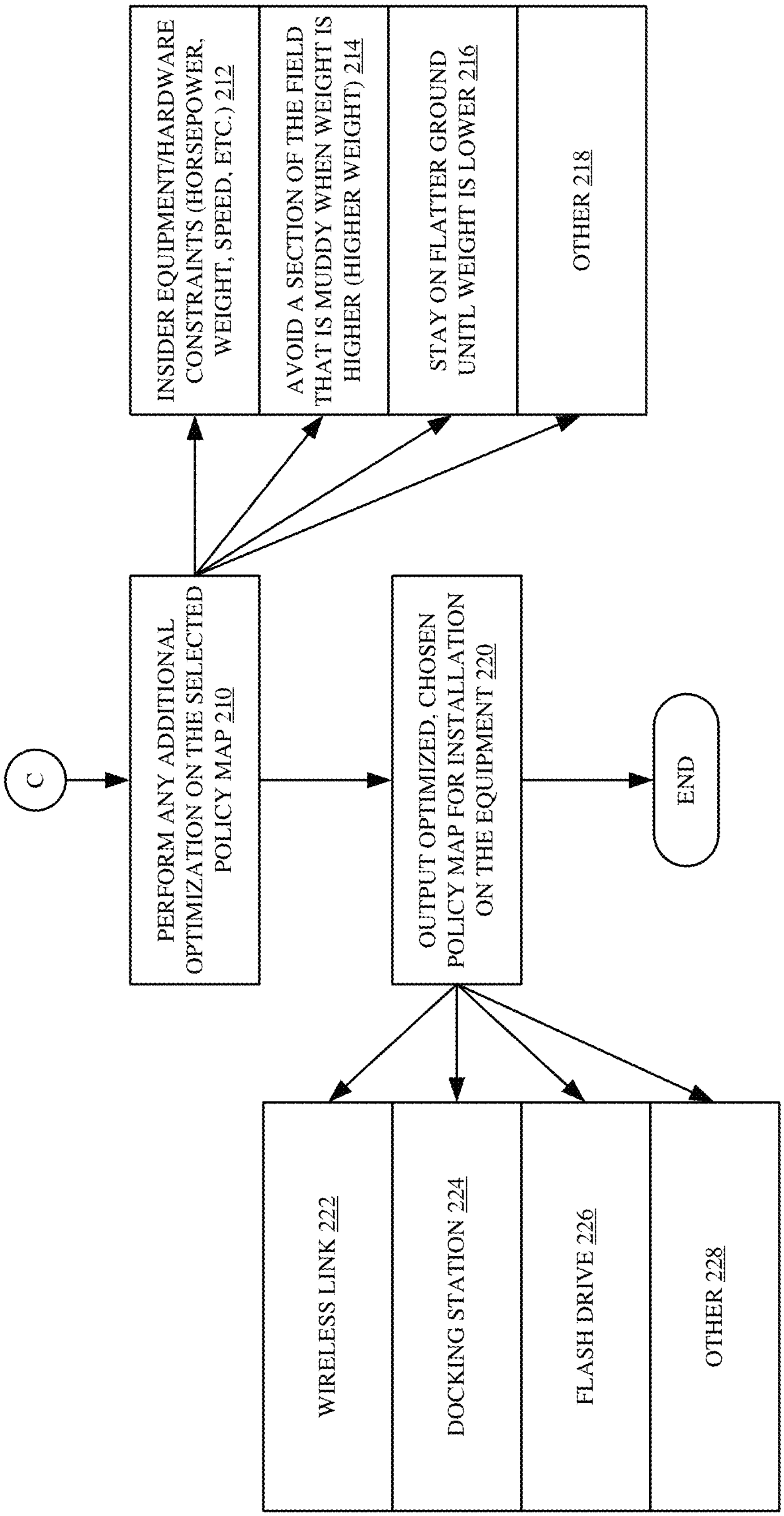

FIGS. 3A, 3B, and 3C (collectively referred to herein as FIG. 3) show a flow diagram illustrating one example of the operation of pre-planning computer system 106 in allowing user 108 to pre-plan a trajectory for performing an operation in a field. In one example, user 108 obtains plant model 136 for the particular equipment and the particular operation that are to be performed. Obtaining the plant model 136 for the equipment to be used to perform the operation is indicated by block 150 in the flow diagram of FIG. 3. The plant model 136 can be a user selectable model 152, in which case user 108 may access a library of models for different equipment and for different operations, and select one of them. In another example, plant model 136 may be a dynamically developed model 154, in which case user 108 (or an administrative user or another user) provides characteristics of the equipment to a model generation system that generates plant model 136.

Plant model 136 can illustratively be used to estimate a performance of the equipment, in carrying out a particular operation, using the trajectory input by user 108 or another trajectory. The estimated performance can be in terms of any desired metric. In some examples, the estimated performance of the equipment, in performing the operation, that is output by plant model 136 may be in terms of fuel consumption, in terms of time used to perform the operation, in terms of energy loss, in terms of an effect on the durability of the equipment, etc. Obtaining the plant model 136 that estimates a user selected performance of the equipment is indicated by block 156 in the flow diagram of FIG. 3.

The plant model 136 may be for a particular set of equipment and also for a particular operation. The operation may be a user selectable operation, or a dynamically generated operation. For instance, it may be that multiple plant models 136 are already developed for the same set of equipment, but the models model the performance of that equipment in performing different operations. Some examples of different operations, that can be separately modeled for the same equipment includes a transport operation, a tillage operation, a spraying operation, etc. This is indicated by block 158 in the flow diagram of FIG. 3.

As briefly discussed above, plant model 136 illustratively models a wide range of different characteristics of the equipment. For instance, it can model the drive train 160, the engine and engine performance 162 (or other characteristics of the engine), a thermal response (or change in operating performance) of the equipment to varying temperatures or temperate changes, as indicated by block 164, the controls 166 on the equipment, the traction mechanisms (e.g., wheels or tracks, etc.) 168, any hydraulics 170 on the equipment, any electrical items 172 on the equipment, the responsiveness 174 of the equipment, and it can model a wide variety of other characteristics 176 of the equipment.

Pre-planning computing system 106 then also obtains an objective function (or cost function) that can be run by plant model 136 in order to balance objective criteria in generating a proposed policy map for the operation. For instance, it may balance the cost of time consumed in performing the operation against the cost of fuel used. It may balance these factors against the cost of wear on the machine in performing the operation. It may balance a wide variety of other objective criteria as well. The objective function may be selected by user 108, based upon the objective criteria that he/she considers, or it can be pre-defined and used by plant model 136 as well. It can be obtained in other ways. Obtaining an objective function to balance the objective criteria is indicated by block 178 in the flow diagram of FIG. 3.

At some point, map ingestion logic 128 ingests, or imports maps of the worksite. The maps can be maps 110-116, or other maps. They can be maps that indicate historical characteristics of a harvest from the field, weather that has been encountered at the field during the present or historical years, roads leading to and from the field, soil conditions and soil type in the field, elevation and/or topology of the field, among other things. Importing the maps of the worksite is indicated by block 180 in the flow diagram of FIG. 3.

User interface system 132 then surfaces a user interface for user 108 to define the operation (e.g., the phases, the type of the operation, steps to be performed in the operation, etc.) and to input proposed trajectories for evaluation by plant model 136. Surfacing the user interface is indicated by block 182 in the flow diagram of FIG. 3. User interface mechanism 134 then detects user interaction with the user interface. This is indicated by block 184. The user interactions May be with operation phase configuration system 130 in order to configure the phases of the operation, as indicated by block 186. They may be inputs by which user 108 proposes a trajectory through the field to plant model 136. This is indicated by block 188. By way of example, the user may be able to use a point and click device or another drawing device to draw a trajectory on a field map that is surfaced by user interface system 132, to propose a trajectory, or route through the field.

User 108 may also provide an input selecting or otherwise identifying a control strategy that plant model 136 is to use in evaluating, and generating a policy map for, the proposed trajectory. Selecting a control strategy is indicated by block 190 in FIG. 3. The control strategy may indicate that plant model 136 is to use fuel consumption as a control strategy, time as a control strategy, durability as a control strategy, or other control strategies or combinations of control strategies.

User interface system 132 can also detect a wide variety of other user interactions with the user interface. This is indicated by block 192.

Pre-planning computer system 106 then uses dynamic programming to run the plant model 136 with the identified objective function, given the control strategy, for the proposed trajectory provided by user 108. This is indicated by block 194. For instance, control strategy selection portion 138 of the plant model 136 incorporates the control strategy and dynamic programming cost function analysis portion 140 runs the cost function, using the control strategy, to identify settings values at different points in the field, using the trajectory provided by user 108. Policy map (e.g., trajectory with optimum settings values) output portion 142 then outputs the policy map for the proposed trajectory, given the control strategy identified by the user. This is surfaced for user 108 by user interface system 132. Surfacing the results (e.g., the policy map) generated by model 136 for user 108 is indicated by block 196 in the flow diagram of FIG. 3.

In one example, where the user has proposed multiple trajectories, they can be surfaced by scenario comparison system 146 which allows user 108 to have scenario comparison system 146 perform statistical analysis on the policy maps for the different trajectories in order to compare them against one another. This is indicated by block 198. By way of example, scenario comparison system 146 may be used to surface differences in various metrics, between the two policy maps (or proposed trajectories). The statistical analysis may, for instance, indicate that one proposed trajectory consumes X % more fuel than another proposed trajectory, but the other proposed trajectory will complete the operation in Y % less time. Scenario comparison system 146 may output a value indicative of which proposed trajectory costs less (considering fuel cost, the cost of time, the cost of durability, etc.). It may surface other metrics, or be controlled by user 108 to perform other types of analysis on the results, as well. This is indicated by block 200 in the flow diagram of FIG. 3.

User 108 can illustratively provide multiple different proposed trajectories to pre-planning computer system 106 so that they can all be compared against one another by scenario comparison system 146. The user may also wish to use the same trajectory but change control strategies. Therefore, if the user 108 wishes to provide more proposed trajectories or to change control strategies, the user illustratively actuates a user interface mechanism 134 indicating this, and processing reverts to block 182. This is indicated by block 202 in the flow diagram of FIG. 3.

Pre-planning computer system 106 also illustratively surfaces a user interface through user interface system 132 that allows user 108 to indicate that pre-planning computer system 106 is to suggest an optimal trajectory through the field. If the user indicates this, as indicated by block 203 in the flow diagram of FIG. 3, then policy map suggestion system 148 controls plant model 136 to generate an optimal policy map (it may generate its own trajectory with optimal settings values) using the control strategy selected by user 108. It may also compute an optimal policy map for each of a plurality of different control strategies. Therefore, it May provide an output indicating an optimal policy map for a fuel consumption control strategy. It May provide a different optimal policy map for a time-based control strategy. Computing an optimal policy map for one or more different control strategies is indicated by block 204 in the flow diagram of FIG. 3.

User interface system 132 can surface the results for interaction and comparison by user 108 as well. This is indicated by block 206. For instance, if the user has proposed one or more different trajectories, the policy maps generated by plant model 136 for those trajectories may be surfaced along with the one or more optimal policy maps generated by plant model 136, for comparison by user 108 using scenario comparison system 146.

At some point, it is assumed that user 108 selects a policy map for loading into the equipment, so that the operation can be performed according to that selected policy map. This is indicated by block 208. Pre-planning computer system 106 can also perform additional optimizations on the selected policy map. This may be optional, so that it is authorized by the user 108, before the optimizations are performed, or they can be performed automatically. Performing any additional optimizations on the selected policy map is indicated by block 210 in the flow diagram of FIG. 3. For instance, it may be that policy map suggestion system 148 takes the policy map selected by user 108 and adjusts it by considering equipment or hardware constraints (such as horsepower, weight, speed, etc.) that may not have otherwise been considered. This is indicated by block 212. The adjustments may be made based on historical or present field conditions as well. For instance, even though a user has selected a particular trajectory, it may be that system 148 modifies the trajectory to avoid the section of the field that is muddy, when the weight of the equipment is higher, and the trajectory may be modified to come back to that area of the field when the weight of the equipment is lower. This is indicated by block 214.

By way of example, assume that the operation is for tractor 100 and tank 102 to spread a slurry on the field. When tank 102 is full, it will weigh much more than when it is only half full, or one quarter full. Thus, it may be that policy map suggestion system 148 modifies the trajectory selected by user 108 so that it will avoid muddy spots until tank 102 is less full.

Similarly, system 148 may modify the trajectory so that it stays on flatter ground until the equipment weight is lower as well. This may reduce wear on the equipment. It May conserve fuel, etc. This is indicated by block 216. These are just examples of some of the optimizations that system 148 can make on the selected policy map. It can make a wide variety of other optimizations as well, and this is indicated by block 218.

The optimizations made by system 148 may be proposed to user 108 so that they are only made to the ultimate policy map output by pre-planning computer system 106 if they are authorized by user 108. They may also be made automatically.

Communication system 126 then configures the optimized, selected policy for installation on the equipment 100, 102. Depending on how it is to be installed on the equipment 100, 102, communication system 126 may configure it differently. For instance, it may be installed on equipment 100, 102. Outputting the optimized, chosen policy map for installation on the equipment is indicated by block 220 in the flow diagram of FIG. 3.

There are a variety of different ways that it may be transferred to equipment, 100, 102. For instance, it may be transferred using a wireless link 222, or using a docking station 224 in which the pre-planning computing system 106 is wired for communication with equipment 100, 102. It may be transferred using a flash drive 226, or it may be transferred using a wide variety of other mechanisms 228.

Figure 4:
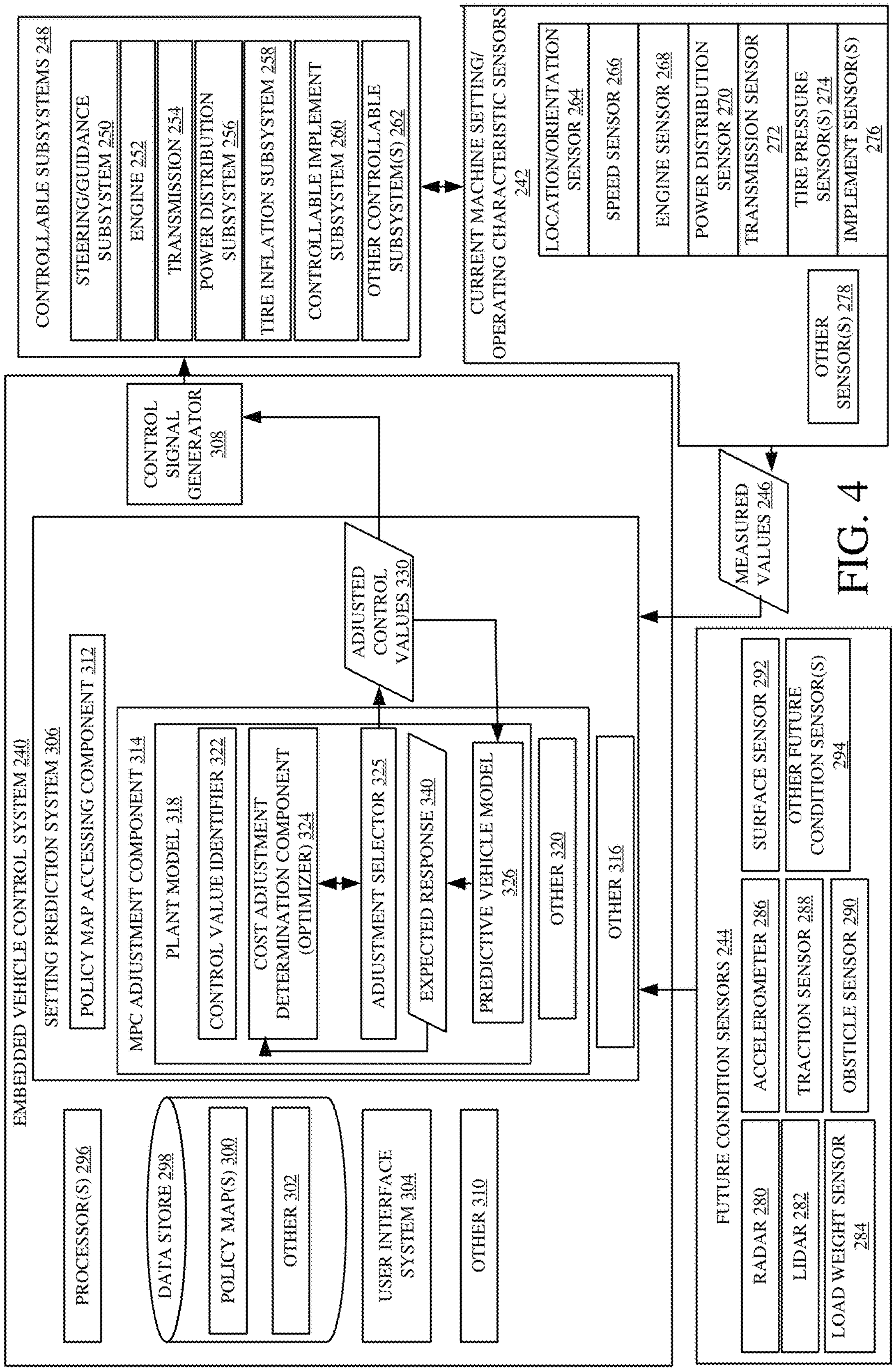
FIG. 4 is a block diagram showing one example of an embedded vehicle control system architecture.

FIG. 4 is a block diagram showing one example of an embedded vehicle control system 240 that can use a model similar to plant model 136, but configured to operate more quickly, to calculate values in near real-time, so that those values can be used to actually control the vehicle. Thus, embedded vehicle control system 240 is illustratively embedded in the equipment (such as tractor 100).

FIG. 4 shows that embedded vehicle control system 240 illustratively receives current information from current machine setting/operating characteristic sensors 242. It also receives values that will be encountered by machine 100 in the near future, from forward-looking (future) condition sensors 244. Embedded vehicle control system 240 uses the current measured values 246 generated by the current machine setting/operating characteristic sensors 242, as well as future values generated by the forward-looking (future) condition sensors 244 and uses the plant model 318 to generate control signals that are used to control one or more of a plurality of different controllable subsystems 248 on equipment 100, 102. The controllable subsystems 248 can include such things as a steering or guidance subsystem 250, engine 252, transmission 254, power distribution system 256, tire inflation system 258, any controllable subsystems on an implement (such as tank 102), as indicated by block 260, and any of a wide variety of other controllable subsystems 262.

In the example shown in FIG. 4, the current machine setting/operating characteristic sensors 242 can include a location/orientation sensor 264 which may be a GPS receiver or another position sensing system, as well as an accelerometer or another orientation sensor. Sensors 242 can include a speed sensor 266 which senses the ground speed of the equipment. This can be a processor that processes the output of a GPS receiver to determine changes in location over time. It can be a sensor that senses axel speed, or another sensor that senses ground speed.

Sensors 242 can include any of a wide variety of different types of engine sensors 268. They can sense engine speed, engine heat, torque, or a wide variety of other engine variables. Sensors 242 can include power distribution sensor 270 that senses how power distribution system 256 is distributing power to the various power consumption pieces of the equipment.

Sensors 242 can include transmission sensor 272 that senses transmission 254 to determine the gear ratio of the equipment. Sensors 242 can include tire pressure sensors 274 that sense the inflation pressure of the tires. Sensors 242 can include any of a wide variety of different types of implement sensors 276 that sense variables on an implement (such as tank 102). For instance, the implement sensors 276 can include weight sensors that sense the weight of tank 102, or a wide variety of other variables. Sensors 242 can also include other sensors 278 that sense any of a wide variety of other characteristics or settings on equipment 100, 102.

The example shown in FIG. 4 also illustrates that the forward-looking (future) condition sensors 244 can include a wide variety of different types of sensors that provide information to embedded vehicle control system 240, indicating the conditions that equipment 100, 102 is about to encounter, in the near future. Such sensors can include radar sensor 280, LIDAR sensor 282, load weight sensor 284, accelerometer 286, traction sensor 288, obstacle sensor 290, surface sensor 292, and a wide variety of other future condition sensors 294. Radar 280 and LIDAR 282 can be used to detect a wide variety of different types of conditions. They can be used in conjunction with processing logic (such as obstacle sensor 290) to sense obstacles in the path of equipment 100, 102. They can sense a wide variety of other types of variables as well.

Load weight sensor 284 illustratively senses the weight of the load carried by equipment 100, 102. Therefore, for instance, as tractor 100 uses fuel, and as tank 102 spreads the material it is carrying, load weight sensor 284 (and any corresponding analysis logic) will illustratively indicate that the load in the near future will be reduced by analyzing the rate at which the load has been reduced in the recent past. Accelerometer 296 illustratively generates a signal indicative of how the orientation of the equipment 100, 102 is changing. This, in conjunction with a topology map, may indicate how it will continue to change in the near future.

Traction sensor 288 illustratively senses a variable indicative of traction. This may include wheel slip sensors or other sensors, Thus, it can provide an output that can be used to estimate the traction that will be encountered in the near future.

Surface sensor 292 can sense a characteristic of the surface over which equipment 100, 102 is traveling. For instance, it can sense moisture or mud, rocks, or another variable. It can also sense that variable in an area forward of the equipment 100, 102 in the direction of travel so that a forward-looking value can be obtained.

FIG. 4 shows that, in one example, embedded vehicle control system 240 illustratively includes one or more processors 296, data store 298 (which can store one or more policy maps 300 that may have been loaded into it and other items 302), user interface system 304, setting prediction system 306, control signal generator 308, and it can include a wide variety of other functionality 310. Setting prediction system 306 illustratively includes policy map accessing component 312, model predictive control (M PC) adjustment component 314, and it can include other items 316. M PC adjustment component 314 illustratively includes plant model 318, and other items 320. Plant model 318 can include control value identifier 322, cost determination component (or optimizer) 324, adjustment selector 325 and predictive vehicle model 326.

Before describing the overall operation of embedded vehicle control system 250 in more detail, a brief description of some of the items in system 240, and their operation, will first be described. User interface system 304 can surface information for a user (e.g., an operator) and detect user interactions with user interface mechanisms on the equipment being operated.

As discussed above, policy maps 300 can be output by the pre-planning computer system 106 for the current set of equipment, performing the current operation. They illustratively include a trajectory as well as settings values that are optimized for the equipment and operation, as well as for this field. Setting prediction system 306 generates a set of adjusted control values 330 based on the policy maps, and based upon any adjustments made to accommodate for inputs from the various sensors. The adjustment control values 330 are provided to control signal generator 308 which generates control signals, based upon adjustment control values 330, and applies those control signals to the various controllable subsystems 248 that are being controlled.

Policy map accessing component 312 determines when the operation being performed by equipment 100, 102 begins (or will begin) and accesses a policy map 300 from data store 298 in order for embedded vehicle control system 240 to control the equipment 100, 102, based upon the policy map 300. M PC adjustment component 314 uses model predictive control to determine whether the optimum (or otherwise desired) values in the policy map 300 should be adjusted based upon the current measured values 246 or the future values generated by sensors 244. For instance, the current conditions or the future conditions (about to be encountered by equipment 100, 102) may be different than those considered when the policy map was generated by the pre-planning computing system 106. Therefore, it may be that the values in the policy map 300 (trajectory and/or settings) are to be adjusted based upon the current conditions, and those that are about to be encountered by equipment 100, 102, in performing the operation.

More specifically, policy map accessing component 312 accesses the relevant policy map 300 from data store 298 (the map that was generated for this equipment, to perform this operation, in this field). It provides the map to M PC adjustment component 314. M PC adjustment component 314 includes control value identifier 322 which identifies the optimized control values that are to be used by control signal generator 308 in order to generate the control signals, and that are identified in the policy map 300.

Cost determination component (e.g., optimizer) 324 determines whether the optimized values from the policy map 300 need to be modified or adjusted based upon the current and future conditions received from sensors 242 and 244, respectively. It illustratively generates a cost, using a similar cost function and control strategy employed by plant model 136 in FIG. 2, to determine the cost of making deviations from the optimized values in the policy map or of leaving those values unchanged, given the current and future conditions. It can do this for a plurality of different possible adjustments to determine which adjustments should be made, if any, to the optimized values. Adjustment selector 325 illustratively selects the adjustment that has the least cost, given the objective function and control strategy being employed, and optimizer 324 adjusts the optimized values based on the selected adjustments, selected by the adjustment selector 325. The adjusted values are output as adjusted control values 330. Those values (i.e., adjusted control values 330) are used by control signal generator 308 to generate control signals to control the controllable subsystems 248.

Adjusted control values 330 are also provided back to predictive vehicle model 326, which can be similar to plant model 136, in that it models the behavior or equipment 100, 102. In one example, it may be modified to return values more quickly so that real-time or near real-time operation control can be achieved. It thus generates an expected vehicle response 340 and provides that back to cost determination component (or optimizer) 324. Optimizer 324 can use the expected future vehicle response 340 in conjunction with the actual, current vehicle response (as indicated by measured values 246) and the future sensor values from sensors 244 to generate additional adjusted control values 330, for controlling equipment 100, 102.

There are a wide variety of different types of optimizations that can be done on predictive vehicle model 326 in order to make it operate more quickly than plant model 136 in pre-planning computer system 106. For instance, the resolution of the values computed by the model can be modified based upon the speed of the equipment. Similarly, unrealistic cases can be removed from consideration by the model. For instance, there may be theoretical values calculated which would require the engine to run over its maximum capacity (speed or output). Those values need not be calculated, because they are not realistic values for control. Therefore, they can be eliminated to speed up processing of the predictive vehicle model 326. Similarly, if a value is near a mathematical singularity, it may be eliminated. This may be identified by determining the amount of time that the model is taking to calculate the value. If it is near a singularity, the amount of time will be relatively high. If the amount of time needed to calculate a value exceeds a threshold, then it can be eliminated from consideration, further speeding up model performance. Further, the predictive vehicle model 326 illustratively calculates the expected response 340 of the equipment over a time horizon (such as the expected vehicle response over the next one second, five seconds, 10 seconds, etc.). If a value is calculated during a previous time horizon, then it may be stored so that the predictive vehicle model 326 need not recalculate it when it is computing the next time horizon (or any subsequent time horizon) if the equipment has not arrived at that point yet. In addition, the predictive vehicle model 326 can use anti-hunting techniques so that if a computation for a point in the field is frequently switching between two different values (e.g., the value indicates that the transmission should switch between gears 6 and 7 frequently) then the predictive vehicle model 326 can employ an anti-hunting mechanism so that the output control value only changes after a particular amount of time has passed. This will eliminate such frequent "hunting" between values, and it will increase the model calculation speed. These are some modifications that can be made to the predictive vehicle model 326 to make it operate quickly enough so that real-time control can be obtained. Other are contemplated herein as well.

Figure 5A:
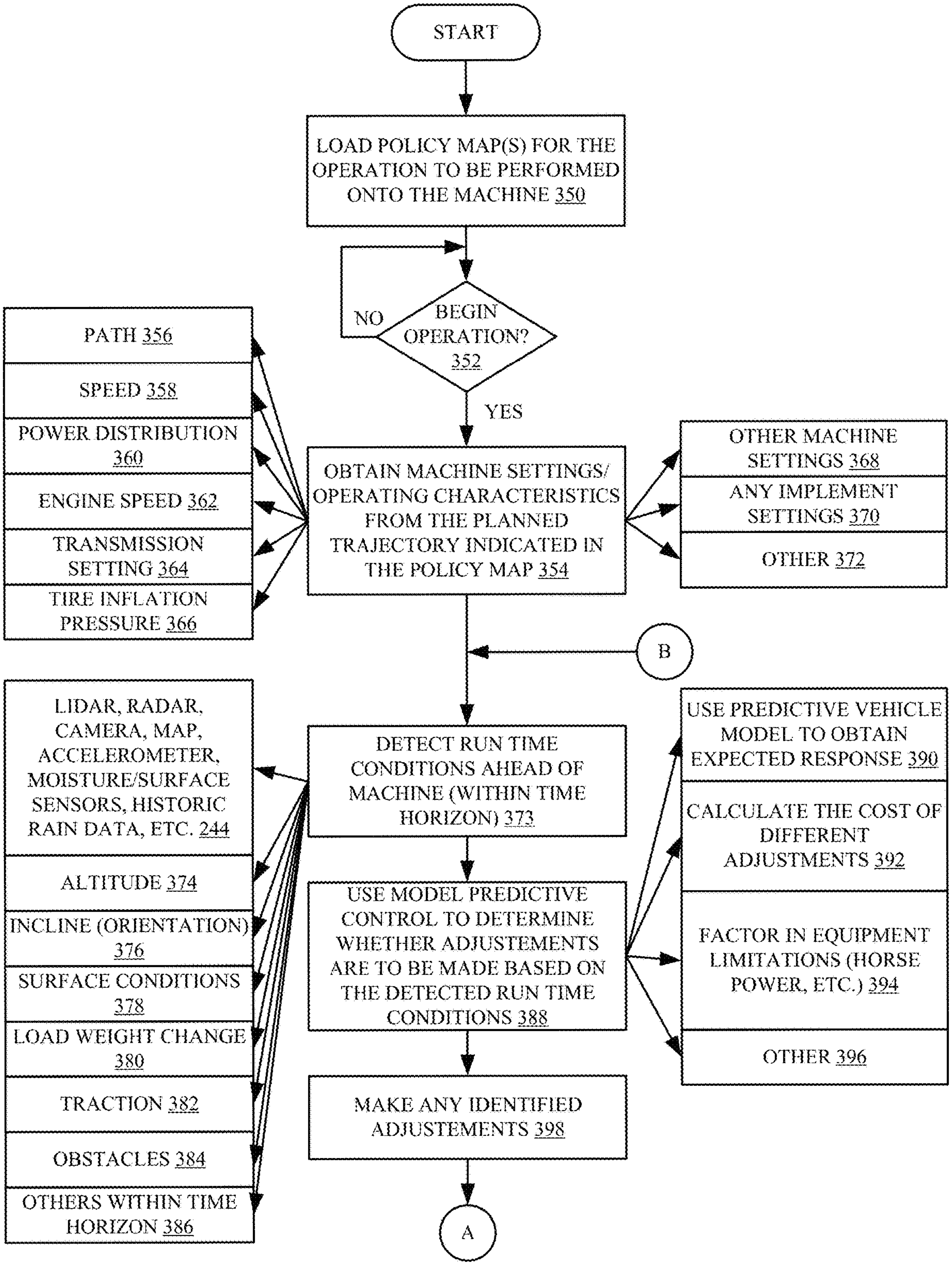
FIGS. 5A and 5B (collectively referred to herein as FIG. 5) show examples of the operation of the embedded vehicle control system architecture shown in FIG. 4.
Figure 5B:
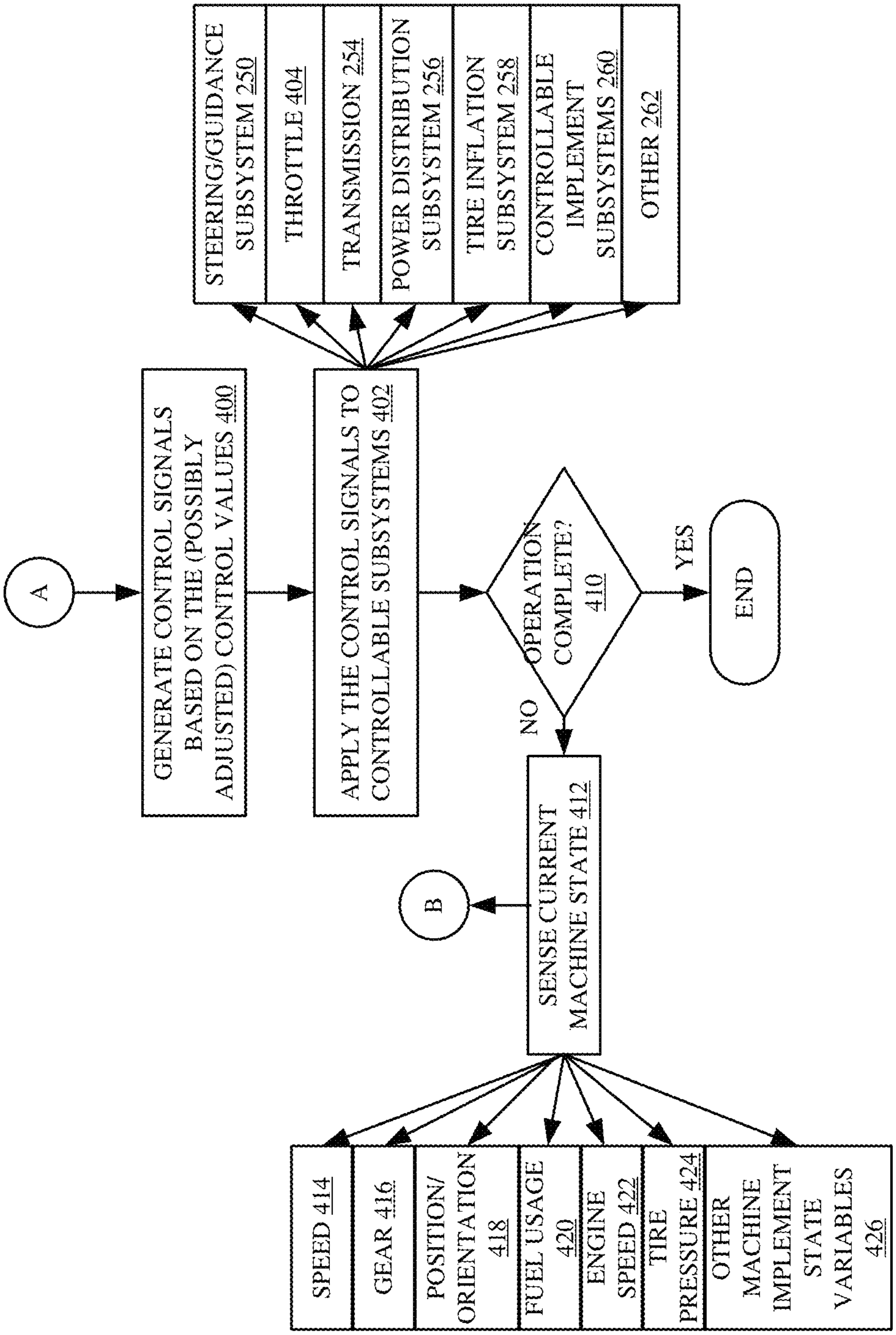

FIGS. 5A and 5B (collectively referred to herein as FIG. 5) show one example of a flow diagram illustrating the operation of embedded vehicle control system 240, in more detail.

It is first assumed that policy map 300, for the current operation to be performed with the current machine, in the identified field, is loaded onto the embedded vehicle control system 240 on the equipment or machine 100, 102. This is indicated by block 350 in the flow diagram of FIG. 5. Embedded vehicle control system 240 detects when the operation begins, as indicated by block 352. It can do this by receiving an operator input indicating that the operation has begun, or by automatically detecting actuation of certain functionality on the equipment 100, 102, indicating that the operation is beginning, or in other ways.

Setting prediction system 306 then uses policy map accessing component 312 to access the policy map 300 from data store 298. Control value identifier 322 obtains the machine settings, operation characteristics, trajectory, etc. from the policy map 300. This is indicated by block 354. Policy map 300, as discussed above, can include the path or route 356, the prescribed speed 358, the power distribution settings 360, engine speed settings 362, transmission settings 364, tire inflation pressures 366, and a wide variety of other machine settings 368 and any implement settings 370. The policy map 300 can of course include a wide variety of other items 372 as well.

Forward-looking (future) condition sensors 244 then detect runtime conditions ahead of the machine, within a time horizon. This is indicated by block 373. Sensors 244 thus provide values indicative of future conditions, that machines 100, 102 will encounter in the near future. Thus, as described above, sensors 244 can include RADAR sensor 280, LIDAR sensor 282, an optical sensor, maps, moisture/surface condition sensors 292, historic rain data, traction sensor 288, load weight sensor 284, or any of a wide variety of other future condition sensors 294. The sensors can provide signals indicative of values (or values can be derived from them) that are indicative of altitude 374, incline (or orientation) 376, surface conditions 378, the change in the weight of the load on the equipment 100, 102, as indicated by block 380, traction 382, obstacles 384, and any of a wide variety of other values that are sensed within the particular time horizon being used. This is indicated by block 386. These values are illustratively provided to M PC adjustment component 314 which uses model predictive control to determine whether adjustments are to be made to the optimum values in the policy map, based upon the detected runtime conditions. This is indicated by block 388 in the flow diagram of FIG. 5.

MPC adjustment component 314 can use predictive vehicle model 326 to obtain expected response 340. This is indicated by block 390 in the flow diagram of FIG. 5. Cost determination component (or optimizer) 324 can calculate the cost of different adjustments that may be made to the optimum values provided in the policy map. This is indicated by block 392. Component 324 and model 326 can also factor in equipment limitations (such as horse power, etc.). This is indicated by block 394. Using model predictive control to determine whether adjustments should be made to the optimized values in the map, based upon the detected runtime conditions, can be done in a wide variety of other ways as well. This is indicated by block 396.

Adjustment selector 325 can make any identified adjustments to the optimized values in the policy map, based upon the determinations made by optimizer 324 and model 326. Making any identified adjustments is indicated by block 398 in the flow diagram of FIG. 5.

The adjusted control values 330 are then provided to control signal generator 308 which generates control signals based upon the adjusted control values (if they are indeed adjusted). Generating the control signals based on the output of M PC adjustment component 314 is indicated by block 400 in the flow diagram of FIG. 5.

Control signal generator 308 then applies the control signals to the various controllable subsystems 248 in order to control equipment 100, 102, based upon past, present and future conditions. Applying the control signals to the controllable subsystems is indicated by block 402 in the flow diagram of FIG. 5. A gain, the controllable subsystems 248 can include such things as a steering/guidance subsystem 250, a throttle input or other engine inputs 404, the power distribution subsystem 256, the transmission 254, the tire inflation system 258, the controllable implement subsystems 260, or any of a wide variety of other controllable subsystems 262.

If the operation is not yet complete, as indicated by block 410 in FIG. 5, then the current machine setting/operating characteristic sensors 242 sense the current machine state. This is fed back as measured values 246 to setting prediction system 306 in order to accommodate the current, runtime machine state being encountered by equipment 100, 102. Sensing the current machine state is indicated by block 412 in FIG. 5. The current machine state can include machine ground speed 414, the gear or gear ratio 416 that the machine is in, the position and/or orientation 418 of the machine, fuel usage 420, engine speed 422, tire inflation pressure 424, and any of a wide variety of other machine/implement state variables indicating the current state of the machine or implement. This is indicated by block 426.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well. 2

Figure 6:
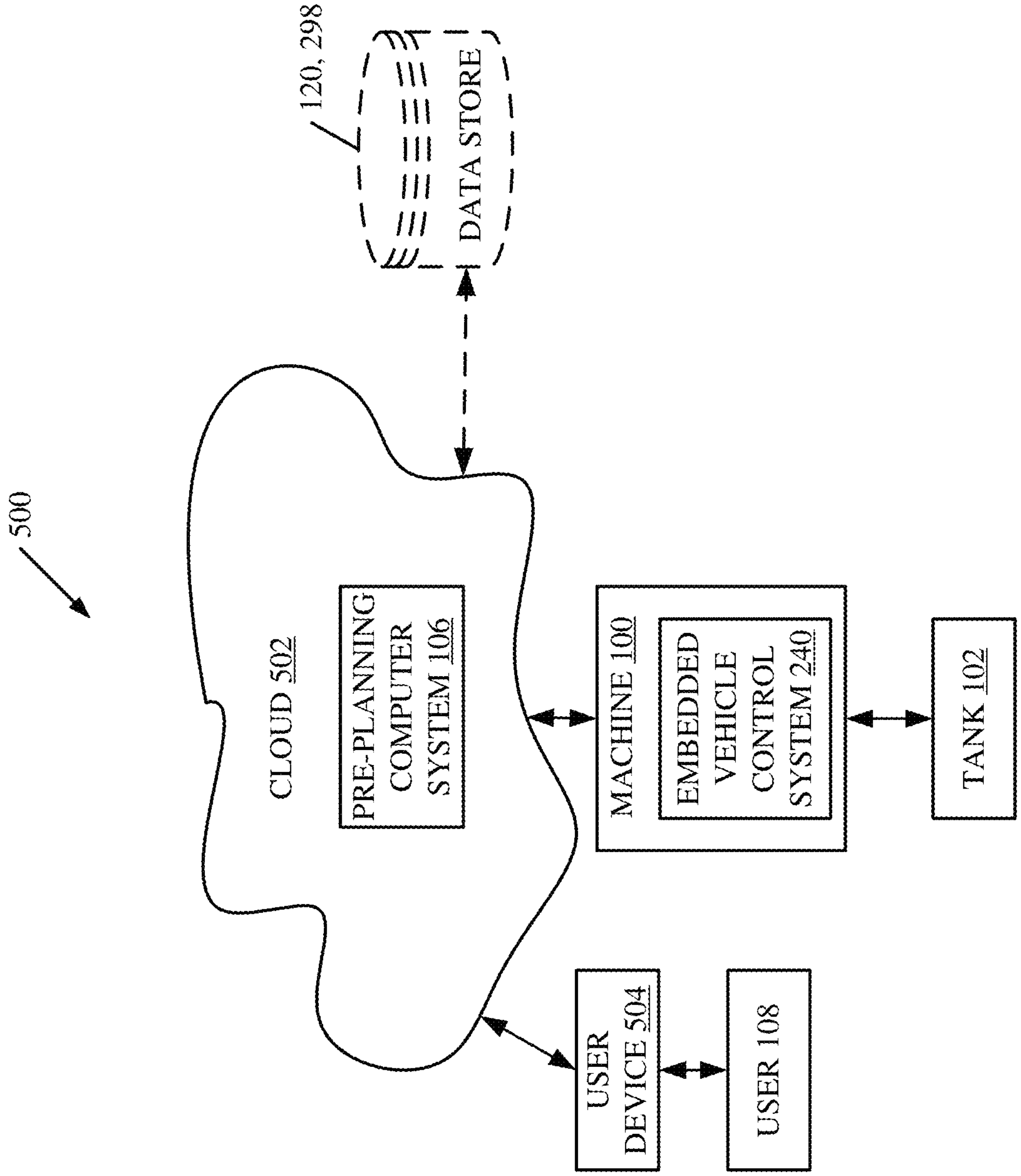
FIG. 6 shows one example of the computing systems depicted in previous figures, disposed in a remote server environment.

FIG. 6 is a block diagram of machine 100, 102, shown in FIG. 1, except that they communicate with elements in a remote server architecture 500. In one example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 2 and 4 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIGS. 2 and 4 and they are similarly numbered. FIG. 6 specifically shows that pre-planning computer system 106 can be located at a remote server location 502. Therefore, user 108 accesses those systems through user device 504.

FIG. 6 also depicts another example of a remote server architecture. FIG. 6 shows that it is also contemplated that some elements of FIG. 2 are disposed at remote server location 502 while others are not. By way of example, data stores 120, 298 can be disposed at a location separate from location 502, and accessed through the remote server at location 502. Regardless of where they are located, they can be accessed directly by user device 504 and machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties.

It will also be noted that the elements of FIGS. 2 and 4 or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
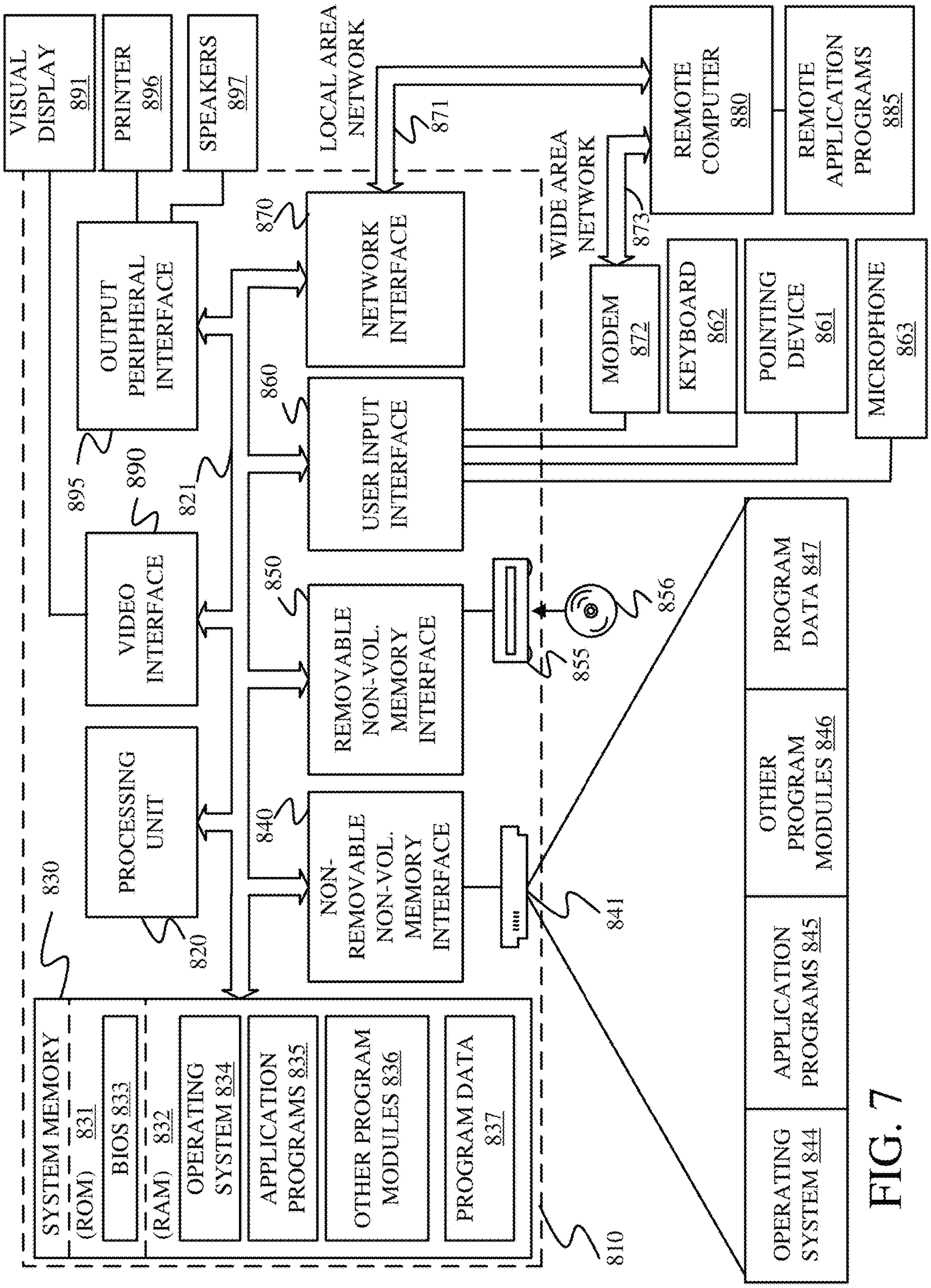
FIG. 7 is a block diagram of one example of a computing environment that can be used in the architectures and computing systems shown in the previous figures.

FIG. 7 is one example of a computing environment in which elements of FIGS. 2 and 4, or parts of them, (for example) can be deployed. With reference to FIG. 7, an example system for implementing some embodiments includes a computing device in the form of a computer 810 configured or programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 2 and 4 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 7 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural vehicle control system, comprising:

a forward looking condition sensor that, as the vehicle is performing an operation, senses a future condition that the vehicle will encounter in performing the operation and generates a forward-looking sensor signal based on the sensed future condition;

a current vehicle sensor that senses a current vehicle operating characteristic and generates a current condition sensor signal indicative of the current vehicle operating characteristic;

a predictive vehicle model that models the agricultural vehicle in performing the operation and that receives the forward looking sensor signal, the current condition sensor signal, and control values used to generate control signals to control a set of controllable subsystems on the agricultural vehicle to perform the operation, and generates an expected vehicle response output indicative of expected vehicle response characteristics;

an adjustment component that obtains policy map values indicative of a machine trajectory and machine settings for the agricultural vehicle, at different locations along the machine trajectory, and determines whether an adjustment is to be made to the policy map values based on the expected vehicle response output, and generates an adjustment output based on the determination;

a selector that selects control values based on the adjustment output; and a control signal generator that generates the control signals based on the control values.

Example 2 is the agricultural vehicle control system of any or all previous examples and further comprising:

a user interface system configured to detect an operation user input indicative of the operation and a location input indicative of a location where the agricultural vehicle is to perform the operation.

Example 3 is the agricultural vehicle control system of any or all previous examples wherein the policy map corresponds to the agricultural vehicle, the operation and the location.

Example 4 is the agricultural vehicle control system of any or all previous examples and further comprising:

a policy map accessing component configured to access the policy map corresponding to the agricultural vehicle, the operation, and the location.

Example 5 is the agricultural vehicle control system of any or all previous examples wherein the adjustment component comprises:

a control value identifier that identifies, from the policy map, trajectory values and settings values to be used by the agricultural vehicle over a time horizon, in performing the operation, based on a speed of the agricultural vehicle.

Example 6 is the agricultural vehicle control system of any or all previous examples wherein the adjustment component is configured to apply a cost function to a plurality of different possible adjustments to optimize a set of criteria, given an operator selected control strategy, and to generate the adjustment output based on a result of applying the cost function to the plurality of different possible adjustments.

Example 7 is the agricultural vehicle control system of any or all previous examples wherein the selector is configured to select the control values based on the possible adjustment with a lowest cost.

Example 8 is the agricultural vehicle control system of any or all previous examples wherein the control signal generator is configured to generate control signals to control a controllable subsystem on an implement connected to the vehicle.

Example 9 is a method of controlling an agricultural machine, comprising:

sensing, as the agricultural machine is performing an operation, a future condition that the agricultural machine will encounter in performing the operation;

generating a forward-looking sensor signal based on the sensed future condition;

sensing a current machine operating characteristic as the agricultural machine is performing the operation;

generating a current condition sensor signal indicative of the current machine operating characteristic;

receiving, at a predictive vehicle model that models the agricultural vehicle in performing the operation, the forward looking sensor signal, the current condition sensor signal, and control values used to generate control signals to control a set of controllable subsystems on the agricultural vehicle to perform the operation;

generating, with the predictive vehicle model, an expected machine response output indicative of expected agricultural machine response characteristics;

obtaining policy map values indicative of a machine trajectory and machine settings for the agricultural machine, at different locations along the machine trajectory;

determining whether an adjustment is to be made to the policy map values based on the expected machine response output, and generating an adjustment output based on the determination; and selecting control values based on the adjustment output Example 10 is the method of any or all previous examples and further comprising:

generating the control signals based on the control values.

Example 11 is the method of any or all previous examples and further comprising:

detecting an operation user input indicative of the operation; and detecting a location input indicative of a location where the agricultural machine is to perform the operation.

Example 12 is the method of any or all previous examples wherein obtaining the policy map comprises:

obtaining the policy map corresponding to the agricultural machine, the operation and the location.

Example 13 is the method of any or all previous examples wherein obtaining the policy map comprises:

accessing the policy map, from a data store, corresponding to the agricultural machine, the operation, and the location.

Example 14 is the method of any or all previous examples wherein determining whether an adjustment is to be made comprises:

identifying, from the policy map, trajectory values and settings values to be used by the agricultural machine over an upcoming time period, in performing the operation, based on a travel speed of the agricultural machine.

Example 15 is the method of any or all previous examples wherein determining whether an adjustment is to be made comprises:

applying a cost function to a plurality of different possible adjustments to optimize a set of criteria, given an operator selected control strategy; and generating the adjustment output based on a result of applying the cost function to the plurality of different possible adjustments.

Example 16 is the method of any or all previous examples wherein selecting control values comprises:

selecting the control values based on the possible adjustment with a lowest cost.

Example 17 is the method of any or all previous examples wherein generating the control signals comprises:

generating control signals to control a controllable subsystem on an implement connected to the vehicle.

Example 18 is a computer system, comprising:

map ingestion logic that receives a map of a field on which an agricultural operation is to be performed;

a plant model that receives a proposed trajectory of an identified agricultural machine through the field to perform the agricultural operation and generates, based on a control strategy, a policy map indicative of machine control settings for the agricultural machine along the proposed trajectory, to perform the agricultural operation; and a policy map suggestion system that modifies the policy map based on operational constraints of the agricultural machine.

Example 19 is the computer system of any or all previous examples and further comprising:

a scenario comparison system configured to surface a first performance variable indicative of estimated performance of the agricultural machine using a first trajectory and a second performance variable indicative of estimated performance of the agricultural machine using a second trajectory for user interaction.

Example 20 is the computer system of any or all previous examples wherein the agricultural operation is performed by a plurality of agricultural machines and wherein the plant model models operation of the plurality of machines in performing the agricultural operation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling an agricultural machine, comprising:

obtaining a policy map that maps a machine trajectory and includes prescribed machine setting values for the agricultural machine at different locations along the machine trajectory;

identifying, as the agricultural machine is performing an operation, a future condition that the agricultural machine will encounter at a future location in performing the operation;

sensing a current machine operating characteristic as the agricultural machine is performing the operation;

generating a current condition sensor signal indicative of the current machine operating characteristic;

receiving, at a predictive model that models the agricultural machine in performing the operation, the identified future condition that the agricultural machine will encounter at the future location, the current condition sensor signal, and a machine setting value, in the policy map, corresponding to the future location;

generating, with the predictive model, an expected machine response output indicative of expected agricultural machine response characteristics based on the identified future condition that the agricultural machine will encounter at the future location, the current condition sensor signal, and the machine setting value, in the policy map, corresponding to the future location;

determining that an adjustment is to be made to the prescribed machine setting value in the policy map corresponding to the future location based on the expected machine response output, and generating an adjusted machine setting value based on the determination; and selecting control values based on the adjusted machine setting value.

2. The method of claim 1 and further comprising:

generating control signals based on the selected control values.

3. The method of claim 2 wherein generating the control signals comprises:

generating control signals to control a controllable subsystem on an implement connected to the agricultural machine.

4. The method of claim 1 and further comprising:

detecting an operation user input indicative of the operation; and detecting a location input indicative of a location where the agricultural machine is to perform the operation.

5. The method of claim 4 wherein obtaining the policy map comprises:

obtaining the policy map corresponding to the agricultural machine, the operation and the location.

6. The method of claim 5 wherein obtaining the policy map comprises:

accessing the policy map, from a data store, corresponding to the agricultural machine, the operation, and the location.

7. The method of claim 1 wherein determining that the adjustment to the prescribed machine setting value, in the policy map, corresponding to the future location is to be made comprises:

applying a cost function to a plurality of different possible adjusted machine setting values to optimize a set of criteria, given an operator selected control strategy; and selecting the adjusted machine setting value based on a result of applying the cost function to the plurality of different possible adjusted machine settings adjustments.

8. The method of claim 7 wherein selecting the adjusted machine setting value comprises:

selecting, as the adjusted machine setting value, a possible adjusted machine setting value, of the plurality of different possible adjusted machine setting values, b with a lowest cost.

* * * * *